(12) United States Patent
Fujinaga et al.

(10) Patent No.: US 7,561,285 B2
(45) Date of Patent: Jul. 14, 2009

(54) ENERGY-SAVING CONTROL IN IMAGE PROCESSING APPARATUS

(75) Inventors: Seiya Fujinaga, Ibaraki (JP); Takashi Imai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 777 days.

(21) Appl. No.: 10/414,098

(22) Filed: Apr. 16, 2003

(65) Prior Publication Data

US 2003/0197886 A1  Oct. 23, 2003

(30) Foreign Application Priority Data

Apr. 22, 2002  (JP) .............................. 2002-119345

(51) Int. Cl.
  *G06K 15/00*  (2006.01)
(52) U.S. Cl. ..................... 358/1.14; 358/1.15; 358/296; 713/323; 713/340; 713/321; 713/300; 700/295
(58) Field of Classification Search ................ 358/1.14, 358/1.15, 296; 713/323, 340, 321, 300; 700/295
  See application file for complete search history.

(56) References Cited

U.S. PATENT DOCUMENTS

| | | | | |
|---|---|---|---|---|
| 5,471,621 A | * | 11/1995 | Ohtsuki ....................... | 713/323 |
| 5,758,040 A | * | 5/1998 | Ichimura et al. ........... | 358/1.14 |
| 5,764,864 A | * | 6/1998 | Sujita ......................... | 358/1.14 |
| 5,844,813 A | * | 12/1998 | Tateyama ................... | 700/295 |
| 5,847,836 A | * | 12/1998 | Suzuki ........................ | 358/296 |
| 6,128,104 A | * | 10/2000 | Okabe et al. ................ | 358/442 |
| 6,509,975 B1 | * | 1/2003 | Motegi ....................... | 358/1.14 |
| 6,822,764 B1 | * | 11/2004 | Okabe et al. ................ | 358/442 |
| 7,057,754 B1 | * | 6/2006 | Tsuchiya et al. ........... | 358/1.15 |
| 2002/0039194 A1 | * | 4/2002 | Nakao et al. ................ | 358/1.14 |
| 2002/0109857 A1 | * | 8/2002 | Ueno et al. ................. | 358/1.14 |

FOREIGN PATENT DOCUMENTS

| | | |
|---|---|---|
| JP | 2000-125057 | 3/2000 |
| JP | 2000-078325 | 4/2000 |

* cited by examiner

*Primary Examiner*—Twyler L Haskins
*Assistant Examiner*—Jacky X Zheng
(74) *Attorney, Agent, or Firm*—Fitzpatrick, Cella, Harper & Scinto

(57) ABSTRACT

An image processing apparatus comprising a data processing unit; a first interface unit, having a plurality of logical channels, adapted to connect with an external processing apparatus; a second interface unit, compliant with a same communication standard as the first interface unit and having a plurality of logical channels with a different configuration from the first interface unit, adapted to connect with the data processing unit; a control unit adapted to control overall operation of the image processing apparatus and data transfer between the first interface unit and the second interface unit; a power control unit adapted to control turning ON/OFF power supply to the data processing unit; and a signal line connected to the data processing unit, with which the power control unit controls the data processing unit to turn on when the data processing unit is turned off and is not provided with an automatic power resume feature.

5 Claims, 11 Drawing Sheets

ENERGY-SAVING CONTROL IN IMAGE PROCESSING APPARATUS

FIELD OF THE INVENTION

The present invention relates to energy-saving control in an image processing apparatus.

BACKGROUND OF THE INVENTION

Conventionally, there are multi-function image processing apparatuses having a plurality of functions, such as a printer, a scanner, facsimile communication and the like, which are capable of connecting with a data processing terminal, such as a personal computer (PC). Each of the functions of the image processing apparatus can be controlled independently by the data processing terminal. However, to simultaneously operate these functions so as to fully take advantage of the plurality of functions, the following workload is necessary. First of all, in the data processing terminal, it is necessary to add header information, which specifies a function such as a printer, a scanner, facsimile communication or the like, to the head of an intended control command, edit and packet the data, and transmit the packeted data to the image processing apparatus. Therefore, there are large problems in terms of an alteration workload of a driver which is installed in the data processing terminal, complexity of the control, and a throughput.

Meanwhile, in the image processing apparatus which receives the packeted data from the data processing terminal, it is necessary to analyze the packeted data by a main controller of the image processing apparatus to specify whether the data is related to a printer, a scanner, or facsimile communication. In addition, it is necessary to delete and edit the header information, added to the head of the control command, before transferring the data to the corresponding function (e.g., printer, scanner, facsimile or the like).

Since command data from a data processing terminal is always analyzed by the main controller of the image processing apparatus as described above, there are large problems in terms of poor performance due to the analysis performed by the data processing terminal, and a program design for the analysis.

In view of this, an external interface and an internal interface are matched in units of logical channels so that command data from the data processing terminal can be transferred to respective functions of the image processing apparatus, e.g., a printer, a scanner, or the like, without being analyzed or changed by the main controller of the image processing apparatus.

As described above, since command data transmitted from the data processing terminal to the image processing apparatus can be transferred to respective functions without changing the command data to a unique form of the image processing apparatus, the time required for command analysis of the image processing apparatus can be reduced, and permeability of the command data from the data processing terminal increases. As a result, the performance of the entire image processing system improves.

Meanwhile, there is an image processing apparatus having an energy-saving mode. Herein, the energy-saving mode is a standby mode where an apparatus is on standby with small power consumption. In a case where a user operates an apparatus in the energy-saving mode, the apparatus returns from the energy-saving standby state and performs operation. For instance, according to an apparatus having a conventional energy-saving mode as disclosed in Japanese Patent Application Laid-Open No. 2000-78325, the apparatus shifts to the energy-saving mode when it is on standby, but comes out of the energy-saving mode when it starts operation, and returns to the energy-saving mode after the operation. Furthermore, according to an apparatus disclosed in Japanese Patent Application Laid-Open No. 2000-125057, in a case where a user directly operates the apparatus or the apparatus receives a command from a PC in the energy-saving mode, the command is analyzed by a main CPU of the apparatus and electric power is supplied only to the units to be used in accordance with the analyzed command.

However, in the above-described methods, power consumption of the respective functions, such as a printer, a scanner, or the like, of the image processing apparatus in the energy-saving mode is not always kept low. For instance, assuming a case where a printer has a feature for automatically turning on its power upon command reception, e.g., an automatic power resume feature, since the printer is on standby in a command-receptible state, the printer consumes electric power for this feature even if power supply is reduced.

Furthermore, in the case of an image processing apparatus where an external interface and an internal interface are matched in units of logical channels, only a command from a data processing terminal can be used in the image processing apparatus. Therefore, if each function of the image processing apparatus does not have the automatic power resume feature, in a case of a power-off state, the function whose power is turned off cannot receive the command. As a result, the function cannot turn on the power. However, if the automatic power resume feature is provided to each of the functions, power is consumed even in the energy-saving mode as described above.

SUMMARY OF THE INVENTION

The present invention has been made in consideration of the above situation, and has as its object, in an image processing apparatus where an external interface and an internal interface are matched in units of logical channels, to reduce power consumption of the image processing apparatus in the energy-saving mode, while maintaining permeability of command data inputted from an external data processing apparatus.

According to the present invention, the foregoing object is attained by providing an image processing apparatus comprising: a data processing unit; a first interface unit, having a plurality of logical channels, adapted to connect with an external processing apparatus; a second interface unit, compliant with a same communication standard as the first interface unit and having a plurality of logical channels that have a different configuration from the first interface unit, adapted to connect with the data processing unit; a control unit adapted to control data transfer between the first interface unit and the second interface unit; and a power control unit adapted to control turning ON/OFF power supply to the data processing unit, wherein when power supply is turned off by the power control unit, power supply to the data processing unit is stopped.

According to the present invention, the foregoing object is also attained by providing a control method of an image processing apparatus including: a data processing unit; a first interface unit, having a plurality of logical channels, adapted to connect with an external processing apparatus; a second interface unit, compliant with a same communication standard as the first interface unit and having a plurality of logical channels that have a different configuration from the first interface unit, adapted to connect with the data processing unit; a control unit adapted to control data transfer between the first interface unit and the second interface unit; and a power control unit adapted to control turning ON/OFF power supply to the data processing unit, power supply to the data processing unit being stopped when power supply is turned off by the power control unit, the control method comprising: detecting setting/canceling of an energy-saving mode; and turning on power supply to the data processing unit by the power control unit in a case where a cancellation state of the energy-saving mode is detected.

According to the present invention, the foregoing object is also attained by providing a control method of an image processing apparatus including: a first interface unit, having a plurality of logical channels, adapted to connect with an external processing apparatus; a second interface unit, compliant with a same communication standard as the first interface unit and having a logical channel that has a different configuration from the first interface unit, adapted to connect with a data processing unit; a control unit adapted to control data transfer between the first interface unit and the second interface unit; and a power control unit adapted to control turning ON/OFF power supply to the data processing unit, power supply to the data processing unit being stopped when power supply is turned off by the power control unit, the control method comprising: identifying an ON/OFF state of power supply to the data processing unit; analyzing a type of data inputted through the first interface unit; and causing to execute the analysis and causing the power control unit to control the data processing unit based on a result of the analysis in a case where a power-off state of the data processing unit is identified.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Figure 1:
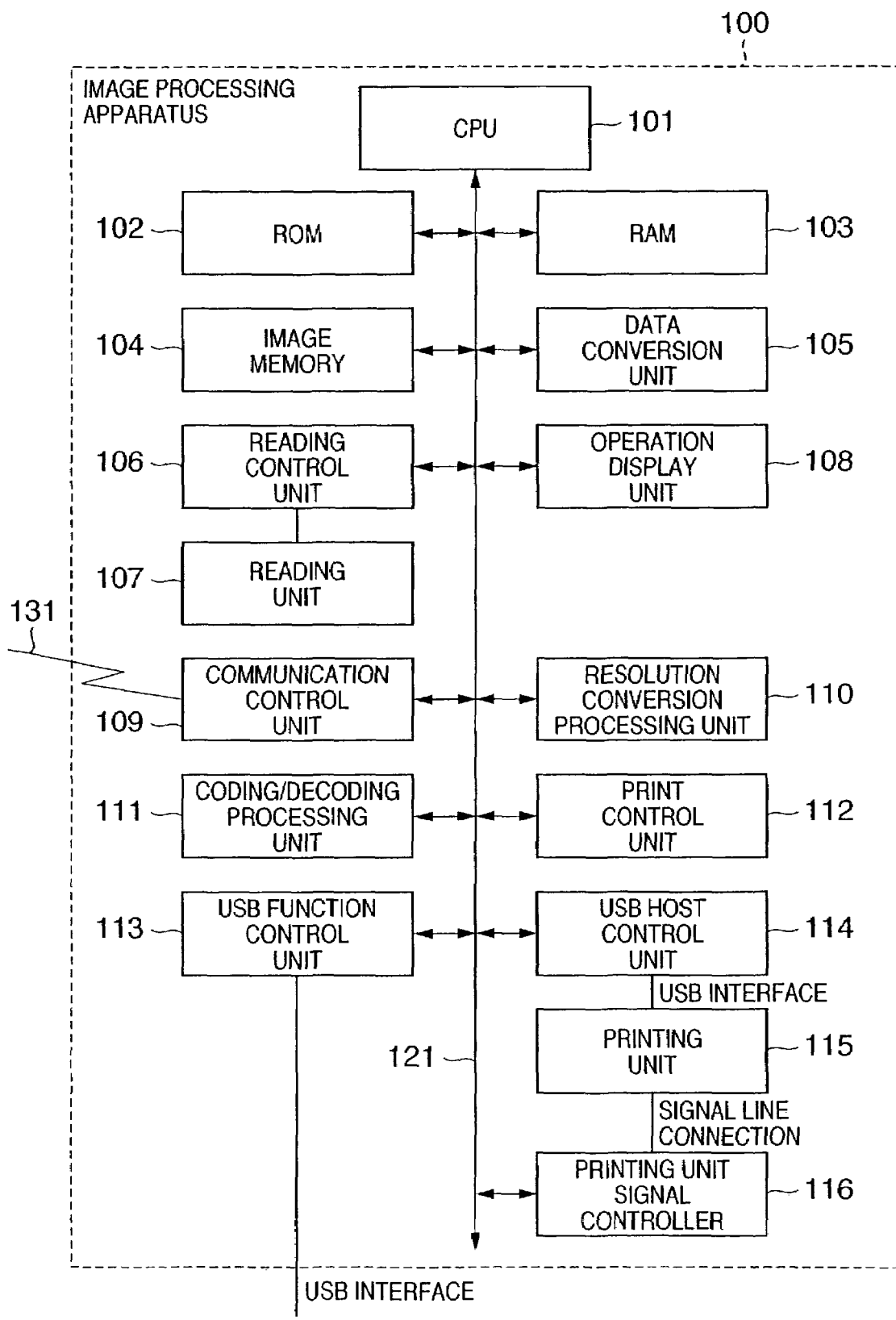
FIG. 1 is a block diagram showing a construction of an image processing apparatus according to an embodiment of the present invention.

A preferred embodiment of the present invention will now be described in detail in accordance with the accompanying drawings.

First, a brief construction of an image processing apparatus 100, which constitutes an image processing system according to the embodiment of the present invention, is described in detail with reference to FIG. 1.

In the image processing apparatus 100, a CPU 101 serving as a system control unit controls the entire image processing apparatus 100. ROM 102 stores control programs and an incorporated operating system (OS) program or the like, which are executed by the CPU 101. In this embodiment, each of the control programs stored in the ROM 102 realizes software controlling, e.g., scheduling, task switch and so on, under the control of the incorporated OS stored in the ROM 102.

RAM 103, configured with SRAM (static RAM) or the like, stores program control variables or the like, and set values registered by an operator as well as control data of the image processing apparatus 100, and so on, and includes a buffer area for various works. Image memory 104, configured with DRAM (dynamic RAM) or the like, stores image data.

A data conversion unit 105 performs image data conversion, such as interpretation of a page description language (PDL) or the like, CG (computer graphics) development of character data and so on.

A reading control unit 106 performs various image processing, e.g., binarization, halftone processing or the like, on an image signal obtained by a reading unit 107, which optically reads an original document with the use of a contact image sensor (CIS) and converts the read data to electric image data, through an image processing control unit (not shown) and outputs high-definition image data. Note in this embodiment, the reading control unit 106 is adaptable to both a sheet-reading control method, which performs reading while conveying an original document, and a book-reading control method, which scans an original document placed on a platen.

An operation display unit 108 includes numeric keys, character keys, one-touch telephone number keys, mode setting keys, an OK key, a cancel key and so on. The operation display unit 108 is constructed with an operation unit for a user to decide an image transmission destination and to perform registration operation of setting data, various keys, a light-emitting diode (LED), a liquid crystal display (LCD), and a display unit for displaying operator's various input operation and an operation state or status of the image processing apparatus 100. Note that the image processing apparatus 100 according to this embodiment includes an energy-saving mode, and setting/canceling of this mode can be executed by an energy-mode setting key.

A communication control unit 109 is constructed with a modulator-demodulator (MODEM), a network control unit (NCU) and so on. In this embodiment, the communication control unit 109 is connected with an analogue communication line (PSTN) 131 to perform communication control according to, for instance, the T30 protocol, or line control such as call out and call in of the communication line. Note that the types of communication line and communication protocol are not limited to those mentioned above. Regardless of wired or wireless communication, an available communication line and communication protocol may be employed.

A resolution conversion processing unit 110 performs resolution conversion control, such as millimeter-to-inch resolution conversion of image data. Note that in the resolution conversion processing unit 110, enlargement/reduction processing of image data is possible. A coding/decoding processing unit 111 performs coding/decoding processing on image data (MH, MR, MMR, JBIG, JPEG or the like) handled by the image processing apparatus 100, or performs enlargement/reduction processing.

A print control unit 112 performs various image processing, e.g., smoothing, print density correction, color correction and so on, on image data subjected to printing through an image processing control unit (not shown), and converts the data to high-definition image data to be outputted to a USB host control unit 114 (to be described later). Furthermore, by controlling the USB host control unit 114, the print control unit 112 also serves to periodically acquire status information of the printing unit 115.

A USB function control unit 113, which performs communication control of a USB interface, performs protocol control according to the USB communication standard, converts data from a USB control task executed by the CPU 101 into packets, and transmits the USB packets to an external data processing terminal, or inversely, converts USB packets from an external data processing terminal into data and transmits the data to the CPU 101.

The USB host control unit 114 controls communication according to a protocol defined by the USB communication standard. The USB communication standard, capable of high-speed two-way data communication, can connect one host (master) with a plurality of hubs or functions (slaves). The USB host control unit 114 serves as the host in the USB communication.

The printing unit 115, which is a printing device configured with a laser beam printer, inkjet printer or the like, prints color image data or monochrome image data on a printing material. The printing unit 115 communicates with the USB host control unit 114 according to a protocol defined by the USB communication standard. Particularly, the printing unit 115 serves as the slave. In this embodiment, the USB communication for using a printing function adopts a one-to-one connection form.

A printing unit signal controller 116 controls signal lines connected to the printing unit 115. Assuming that the printing unit 115 is a standalone printer, the controller 116 replaces various keys, including a power-ON/OFF key normally provided to a standalone printer, with signal lines for controlling them. By the printing unit signal controller 116 controlling the signal lines, operation corresponding to a key input is realized. In this embodiment, the printing unit signal controller 116 at least controls power ON/OFF of the printing unit 115 by controlling the signal lines. Note that the power ON/OFF control realized by the printing unit signal controller 116 will be described later in detail.

The aforementioned components 101 to 106, 108 to 114, and 116 are connected to each other through a CPU bus 121 which is controlled by the CPU 101.

Figure 2:
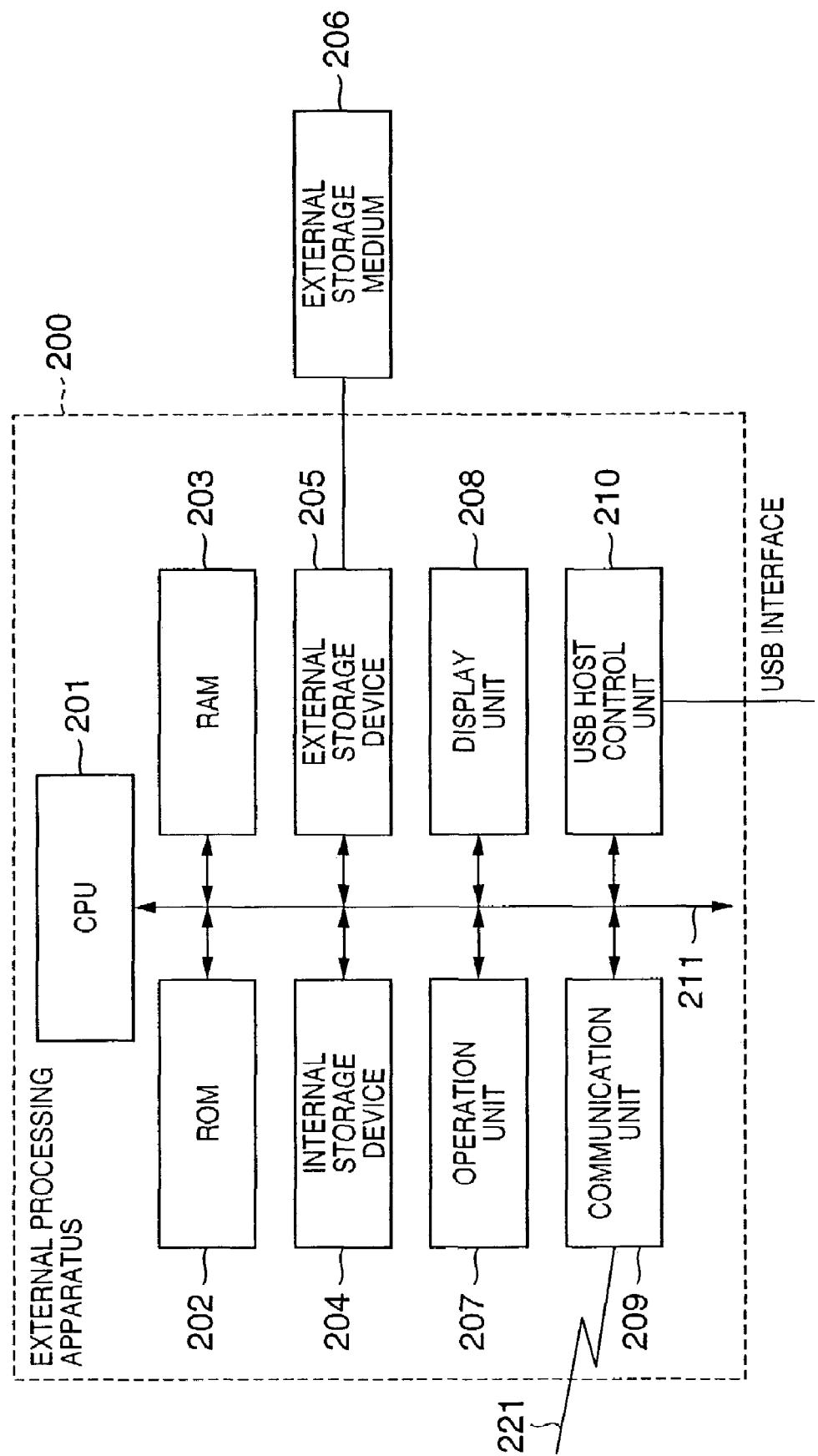
FIG. 2 is a block diagram showing a construction of a processing apparatus according to the embodiment of the present invention.

Next, a brief construction of a processing apparatus 200, e.g., a data processing terminal, which constitutes the image processing system together with the image processing apparatus 100, is described with reference to FIG. 2.

A CPU 201 controls the entire operation of the processing apparatus 200 through a system bus, according to a program which is read out of ROM 202, RAM 203, or an internal storage device 204, or a program read out of an external storage medium 206 by an external storage device 205.

The ROM 202 stores a control program or the like of the CPU 201. The RAM 203 temporarily stores a program or image data to enable high-speed processing of the processing apparatus 200.

The internal storage device 204 stores an operating system, various application programs, image data and so on. Assume that the internal storage device 204 is installed with application software for transmitting/receiving various commands and data to/from the image processing apparatus 100, which include character data processing steps according to the present embodiment, printer driver software, scanner driver software, facsimile driver software, USB-class driver software for each function, USB bus driver software and so forth. Normally, these application software and driver software are installed by receiving data from the external storage medium 206 (floppy disk or CD-ROM) and controlling the external storage device 205. Alternatively, the application software and driver software can be received by a communication unit 209 (network or modem) through a communication line and installed in the internal storage device 204.

An operation unit 207 controls a keyboard or a mouse (not shown), which serves as operator's designation input means. To execute printing, normally the keyboard or mouse of the operation unit 207 is used.

A display unit 208 performs various displaying for an operator. In a case where printing execution is designated by the external processing terminal 200, a confirmation dialogue or the like is displayed on the display unit 208 to prompt an operator to input. Further, during execution of a printing operation, data indicative of print statuses is provided to the operator.

The communication unit 209 realizes connection with a network (not shown), realizes connection with an Internet provider through a communication line, or performs communication of data, image data or the like with a destination communication apparatus. Note with respect to connection with a network or a communication line, assume that a well-known method is used; thus a description thereof is omitted.

A USB host control unit 210, which performs communication control of a USB interface, converts data from the CPU 201 into packets in accordance with the USB communication standard and transmits the USB packets to the image processing apparatus 100, or inversely, converts USB packets from the image processing apparatus 100 into data and transmits the data to the CPU 201. With respect to a communication control method, assume that a well-known communication control method is used; thus a description thereof is omitted.

Figure 3:
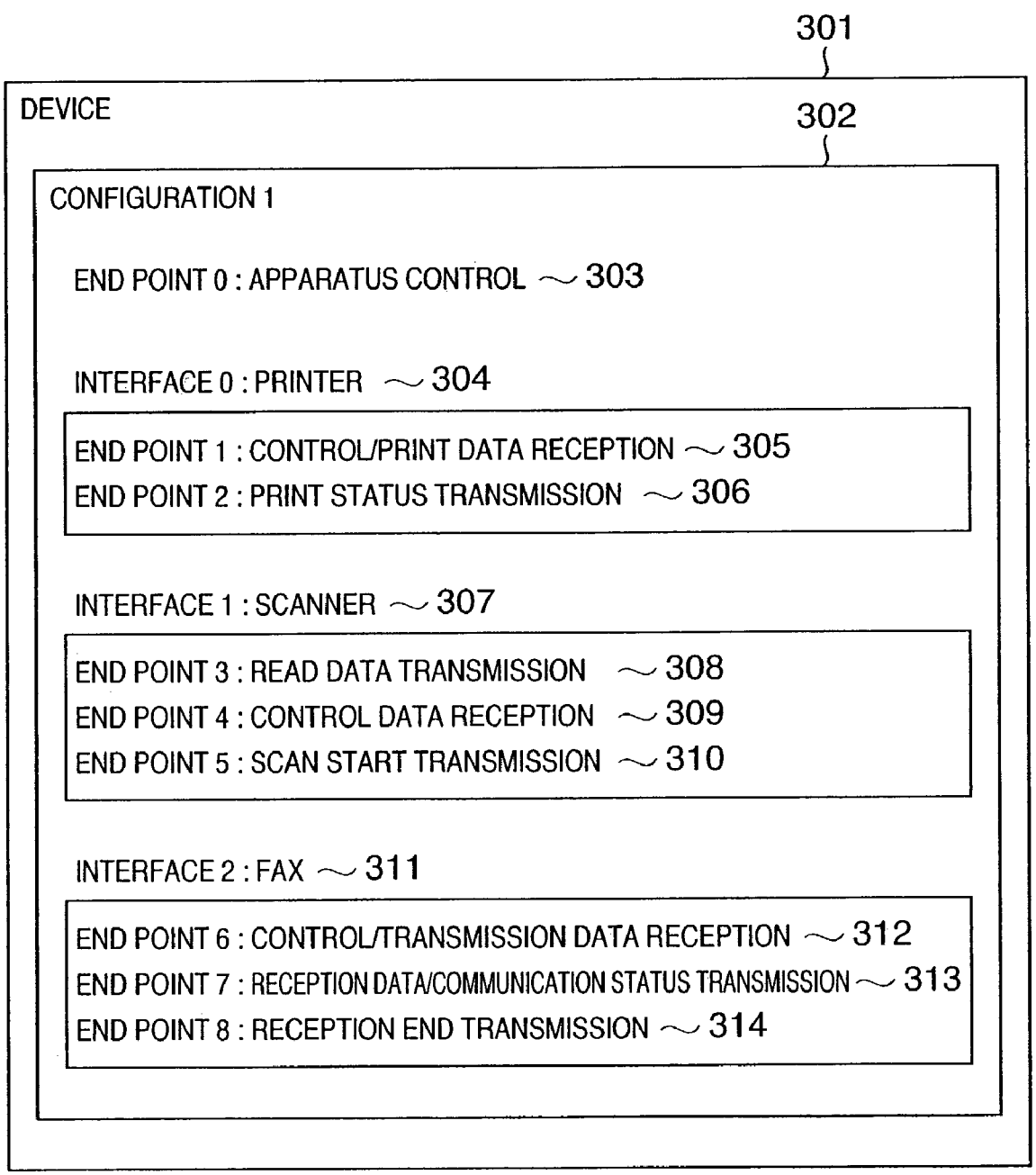
FIG. 3 is a conceptual view showing a USB configuration of the image processing apparatus according to the embodiment of the present invention.

FIG. 3 is a conceptual view showing a configuration of the image processing apparatus 100 according to the embodiment of the present invention. The expression of the configuration is compliant with the USB communication standard. The USB function control unit 113 controls the USB interface according to this configuration.

A device 301 represented by the largest frame can be defined solely according to the USB communication standard, and indicates an attribute of the entire apparatus. The apparatus mentioned herein corresponds to the image processing apparatus 100. The attribute of the device 301 is expressed by a device descriptor, which includes an apparatus manufacturer ID, a product ID, a release number, the number of configurations and so forth. In this embodiment, the number of configurations is "1".

Accordingly, in the device 301, only one configuration (configuration 1 (302)) is defined. An attribute of the configuration 1 (302) is expressed by a configuration descriptor, which includes the number of interfaces in the configuration. In this embodiment, the number of interfaces is "3".

Accordingly, in the configuration 1 (302), three interfaces (interfaces 0 to 2 (304, 307, 311)) are defined. Attributes of the interfaces 0 to 2 (304, 307, 311) are expressed by an interface descriptor, which includes the number of end points in the interface, a class code and so forth. In this embodiment, the number of end points (the number of logical channels) in the interface 0 (304) used for a printer is "2"; the number of end points in the interface 1 (307) used for a scanner is "3"; and the number of end points in the interface 2 (311) used for FAX transmission/reception is "3".

Accordingly, in the interface 0 (304) used for a printer, two end points (end points 1 and 2 (305, 306)) are defined. Attributes of the end points 1 and 2 (305, 306) are expressed by an end point descriptor, which includes an end point number of the end point, a communication direction, the type of transfer, a packet size and so forth. The end point 1 (305) is used mainly for receiving control data or print data. The end point 2 (306) is used mainly for transmitting a received print status of print data.

Furthermore, in the interface 1 (307) used for a scanner, three end points (end points 3, 4 and 5 (308, 309, 310)) are defined. Attributes of the end points 3, 4 and 5 (308, 309, 310) are expressed by an end point descriptor, which includes an end point number of the end point, a communication direction, the type of transfer, a packet size and so forth. The end point 3 (308) is used mainly for transmitting read data. The end point 4 (309) is used mainly for receiving control data. The end point 5 (310) is used mainly for informing a start of scanning.

Furthermore, in the interface 2 (311) used for FAX transmission/reception, three end points (end points 6, 7 and 8 (312, 313, 314)) are defined. Attributes of the end points 6, 7 and 8 (312, 313, 314) are expressed by an end point descriptor, which includes an end point number of the end point, a communication direction, the type of transfer, a packet size and so forth. The end point 6 (312) is used mainly for receiving control data and FAX transmission data. The end point 7 (313) is used mainly for transmitting FAX reception data and a communication state of FAX transmission/reception. The end point 8 (314) is used mainly for informing an end of FAX reception.

Figure 4:
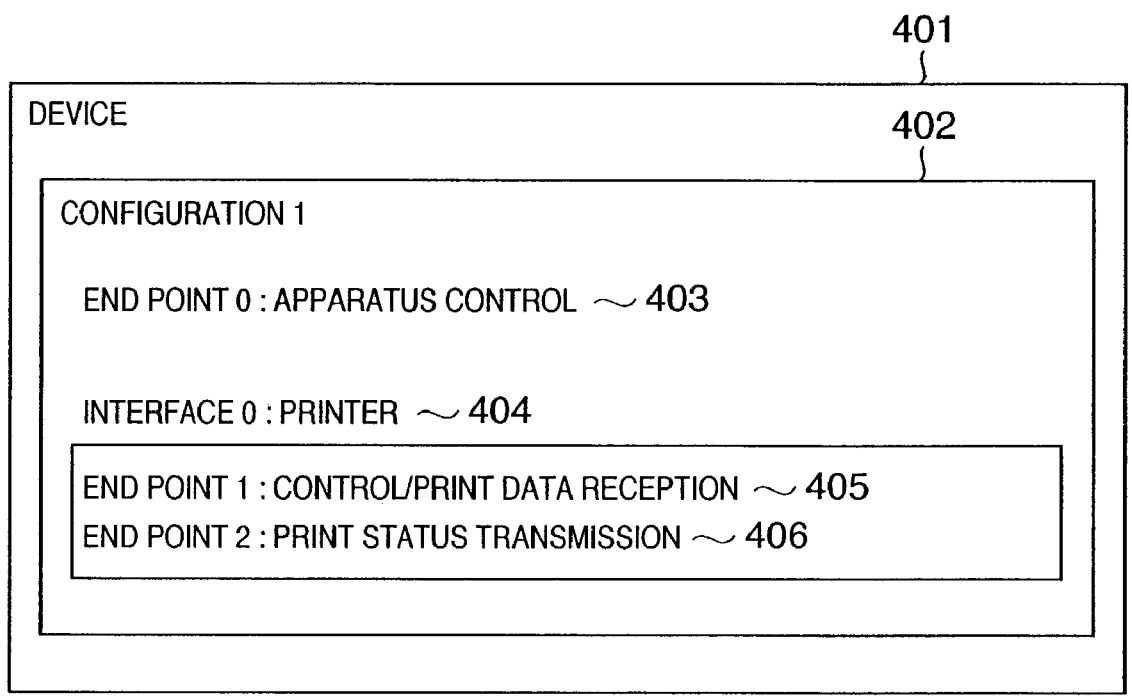
FIG. 4 is a conceptual view showing a USB configuration of a printing unit according to the embodiment of the present invention.

FIG. 4 is a conceptual view showing a configuration of the printing unit 115 according to the embodiment of the present invention. The expression of the configuration is compliant with the USB communication standard.

A device 401 represented by the largest frame can be defined solely according to the USB communication standard, and indicates an attribute of the entire apparatus. The apparatus mentioned herein corresponds to the printing unit 115. The attribute of the device 401 is expressed by a device descriptor, which includes an apparatus manufacturer ID, a product ID, a release number, the number of configurations and so forth. In this embodiment, the number of configurations is "1".

In the device 401, only one configuration (configuration 1 (402)) is defined. An attribute of the configuration 1 (402) is expressed by a configuration descriptor, which includes the number of interfaces in the configuration. In this embodiment, the number of interfaces is "1".

Accordingly, in the configuration 1 (402), only one interface (interface 0 (404)) is defined. An attribute of the interface 0 (404) is expressed by an interface descriptor, which includes the number of end points in the interface, a class code and so forth. In this embodiment, the number of end points in the interface 0 (404) used for printing is "2".

Accordingly, in the interface 0 (404) used for printing, two end points (end points 1 and 2 (405, 406)) are defined. Attributes of the end points 1 and 2 (405, 406) are expressed by an end point descriptor, which includes an end point number of the end point, a communication direction, the type of transfer, a packet size and so forth. The end point 1 (405) is used mainly for receiving control data and print data. The end point 2 (406) is used mainly for transmitting a received print status of print data.

Figure 5:
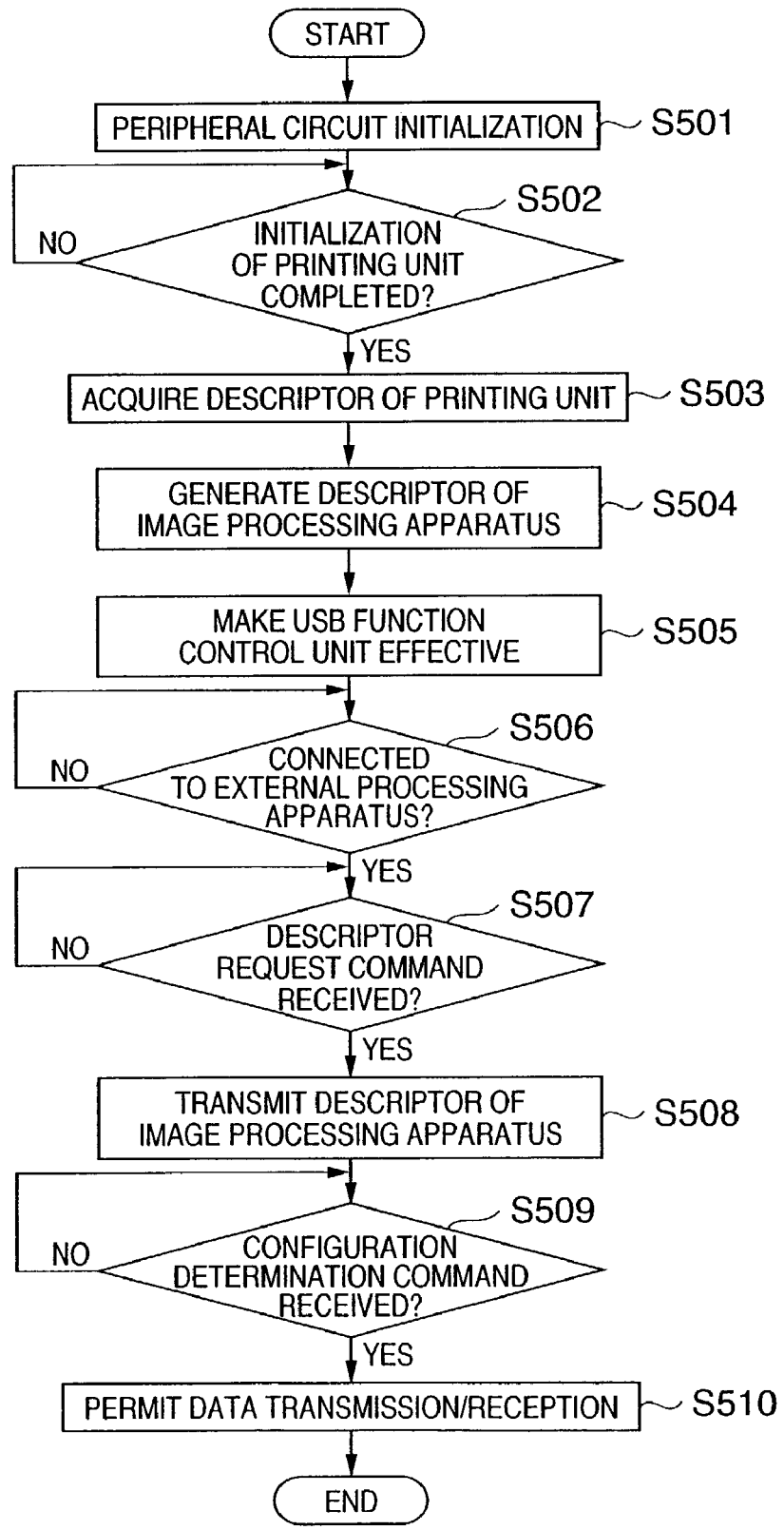
FIG. 5 is a flowchart describing initialization operation of the image processing apparatus according to the embodiment of the present invention.

Next, initialization processing of the image processing apparatus 100, having the above-described construction, is described in detail with reference to the flowchart in FIG. 5. Note that the initialization processing is executed by the CPU 101.

When the power of the image processing apparatus 100 is turned on, in step S501, initialization of the peripheral circuits connected with the CPU bus 121 is performed.

Next in step S502, it is determined whether or not initialization of the printing unit 115, controlled by another CPU (not shown) different from the CPU 101, has been completed. If YES, the control proceeds to step S503. If NO, step S502 is repeated. Initialization completion of the printing unit 115 can be detected by a USB interface of the USB host control unit 114. Alternatively, it can also be detected by directly connecting the CPU 101 and printing unit 115 with a monitoring line.

In step S503, the CPU 101 acquires data indicative of the apparatus configuration of the printing unit 115, which is detected by the USB host control unit 114, and transmits an apparatus configuration determination command (Set_Configuration command) to the printing unit 115 to be activated. For the acquisition of apparatus configuration data of the printing unit 115, the USB interface is employed. The apparatus configuration data is transmitted or received via a logical channel of the end point 0 (403) shown in FIG. 4, which is used for apparatus controlling. The apparatus configuration data of the printing unit 115 includes the above-described device descriptor, configuration descriptor, interface descriptor, end point descriptors (1, 2) and so on, and further includes character strings representing a manufacturer of the printing unit 115, a product name, a serial number and so on. For transmitting the apparatus configuration determination command to the printing unit 115, the USB interface is employed. The apparatus configuration determination command data is transmitted via the logical channel of the end point 0 (403) shown in FIG. 4, which is used for apparatus controlling. By executing the foregoing step at the time of power-on initialization of the image processing apparatus 100, it is possible to assure initialization of the image processing apparatus 100. Moreover, when the apparatus configuration data of the entire image processing apparatus 100 is informed to the processing apparatus 200 (to be described later), it is possible to respond quickly to an apparatus configuration data acquisition command transmitted from the processing apparatus 200.

In step S504, apparatus configuration data of the entire image processing apparatus 100 is generated. The apparatus configuration data is transmitted or received via a logical channel of the end point 0 (303) shown in FIG. 3, which is used for apparatus controlling. The apparatus configuration data of the entire image processing apparatus 100 includes the above-described device descriptor, configuration descriptor, interface descriptors (0 to 2), end point descriptors (1 to 8) and so on, and further includes character strings representing a manufacturer of the entire image processing apparatus 100, a product name, a serial number and so on.

As a part of the apparatus configuration data of the entire image processing apparatus 100, a part of the apparatus configuration data of the printing unit 115 acquired in step S503 is used. For instance, the interface descriptor 0 (304) used for a printer, which is shown in FIG. 3, has the same configuration as the interface descriptor received from the printing unit 115 in step S503, so that print data transmitted from the processing apparatus 200 to the image processing apparatus 100 through the USB interface can be transferred to the printing unit 115 through the USB interface without a change, and print status data transmitted from the printing unit 115 to the USB host control unit 114 through the USB interface can be transferred to the processing apparatus 200 through the USB interface without a change.

By performing the aforementioned control, it is possible to configure the image processing apparatus 100 independent of the type of printing unit 115. More specifically, even in a case where the printing unit 115 is changed to a latest version of a printing unit, the processing steps shown in the flowchart in FIG. 5 need not be changed.

In step S505, to permit communication between the image processing apparatus 100 and processing apparatus 200, the USB function control unit 113 is shifted to a communication effective state. By this stage, initialization of the entire image processing apparatus 100 ends, and the apparatus holds an event-wait state during standby.

In step S506, it is determined whether or not the image processing apparatus 100 is connected with the processing apparatus 200. If YES, the control proceeds to step S507. If NO, step S506 is repeated. The detection of the connection between the image processing apparatus 100 and processing apparatus 200 can be performed by a USB interface of the USB function control unit 113.

In step S507, it is determined whether or not an apparatus configuration data acquisition command (Get_Device_Descriptor command, Get_Configuration_Descriptor command, Get_String_Descriptor command, Get_Device_ID command) is received from the processing apparatus 200 which is connected with the image processing apparatus 100. If YES, the control proceeds to step S508. If NO, step S507 is repeated.

In step S508, the CPU 101 informs the processing apparatus 200 of the apparatus configuration data of the entire image processing apparatus 100, which is generated in step S504. The apparatus configuration data is transmitted via the logical channel of the end point 0 (303) shown in FIG. 3, which is used for apparatus controlling.

In step S509, it is determined whether or not the image processing apparatus 100 has received an apparatus configuration determination command (Set_Configuration command) from the processing apparatus 200. If YES, the control proceeds to step S510. If NO, step S509 is repeated. The apparatus configuration determination command is received via the logical channel of the end point 0 (303) shown in FIG. 3, which is used for apparatus controlling.

In step S510, the image processing apparatus 100 makes the apparatus configuration usable, and shifts to a print-data-reception standby state.

At this stage, if there is an error of some kind in the printing unit 115, such as no ink, no toner, no printing paper, paper jamming or the like, and the printing unit 115 is not ready to receive the print data, the USB function control unit 113 and processing apparatus 200 are set in the state where print data reception is not ready. For instance, if the printing unit 115 detects a crucial error in the printing unit 115 at the time of initializing the printing unit 115 in step S502, the printing unit 115 sets the state where print data cannot be received. The CPU 101, which detects this state through the USB host control unit 114 in step S503, sets the USB function control unit 113 in step S504 in the state where print data reception is not ready, and informs the processing apparatus 200 of this state in step S508. By virtue of this control, the processing apparatus 200 can be informed that the printing unit 115 is not ready to receive print data. Accordingly, since the print data from the processing apparatus 200 is no longer stored and retained in the image memory 104, operation troubles can be prevented.

Moreover, also in a case where a similar error occurs in the printing unit 115 in a standby state after initialization or after completion of printing operation, the state where print data reception is not ready is set in the USB function control unit 113 to achieve the similar effect.

Furthermore, the above description also applies to a case where the printing unit 115 is not ready to transmit data indicative of print statuses. If there is an error of some kind in the printing unit 115, such as no ink, no toner, no printing paper, paper jamming or the like, and the printing unit 115 is not ready to transfer the data indicative of print statuses, the USB function control unit 113 and processing apparatus 200 are set in the state where print-status-data transfer is not ready. For instance, if the printing unit 115 detects a crucial error in the printing unit 115 at the time of initializing the printing unit 115 in step S502, the printing unit 115 sets the state where data indicative of print statuses cannot be transferred. The CPU 101, which detects this state through the USB host control unit 114 in step S503, sets the USB function control unit 113 in step S504 in the state where print-status-data transfer is not ready. By virtue of this control, even in a case where a transfer request of the data indicative of print statuses is transmitted by the processing apparatus 200, the processing apparatus 200 can be informed that the printing unit 115 is not ready to transfer data indicative of print statuses by returning the state where print-status-data transfer is not ready to the processing apparatus 200. Accordingly, operation troubles in the processing can be prevented.

Moreover, also in a case where a similar error occurs in the printing unit 115 in a standby state after initialization or after completion of printing operation, the state where print-status-data transfer is not ready is set in the USB function control unit 113 to achieve the similar effect.

Note that steps S503 and S504 are not necessarily performed immediately after step S502. For instance, processing of steps S503 and S504 may be performed immediately after the connection between the image processing apparatus 100 and processing apparatus 200 is confirmed in step S506. In this case, it is possible to reduce the power-on initialization process of the image processing apparatus 100, thereby reduce the time lag between the power-on and apparatus-ready state of the image processing apparatus 100.

Alternatively, steps S503 and S504 may be performed immediately after the apparatus configuration data acquisition command is received from the processing apparatus 200 connected with the image processing apparatus 100 in step S507. In this case, until the apparatus configuration data acquisition command is received, it is not necessary to acquire apparatus configuration data of the printing unit 115 or generate apparatus configuration data of the entire image processing apparatus 100. Accordingly, an algorithm of the control program can be simplified.

Furthermore, in step S503, the acquisition of the apparatus configuration data from the printing unit 115 and transmission of the apparatus configuration determination command to the printing unit 115 are not necessarily performed simultaneously. For instance, the transmission of the apparatus configuration determination command to the printing unit 115 may be executed at the timing that print data is received from the processing apparatus 200. In this case, by virtue of separately performing the acquisition of the apparatus configuration data from the printing unit 115 and the transmission of the apparatus configuration determination command to the printing unit 115, an effect of clarified algorithm of the control program can be expected.

Next, printing operation of the image processing apparatus 100 is described in detail with reference to FIGS. 6 to 8.

Figure 6:
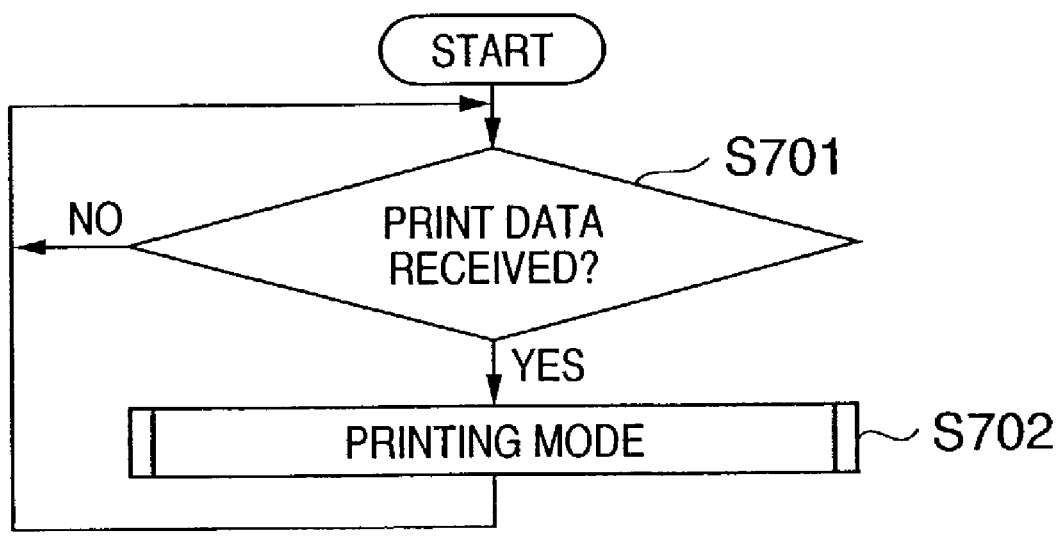
FIG. 6 is a flowchart describing a print-operation start procedure according to the embodiment of the present invention.

FIG. 6 is a flowchart describing print-operation start of the image processing apparatus 100, which is executed by the CPU 101.

First, in step S701, it is determined whether or not the image processing apparatus 100 has received print data from the processing apparatus 200. If YES, the control proceeds to step S702. If NO, step S701 is repeated. The print data is received via a logical channel of the end point 1 (305) shown in FIG. 3, which is used for receiving control data and print data. Furthermore, the print data is received in a packet form, delimited in a predetermined length.

In step S702, the image processing apparatus 100 shifts to a printing mode for printing the print data received from the processing apparatus 200. Details of the printing mode will be described later. When the printing mode is completed, the image processing apparatus 100 shifts again to the standby state for receiving print data from the processing apparatus 200.

Figure 7:
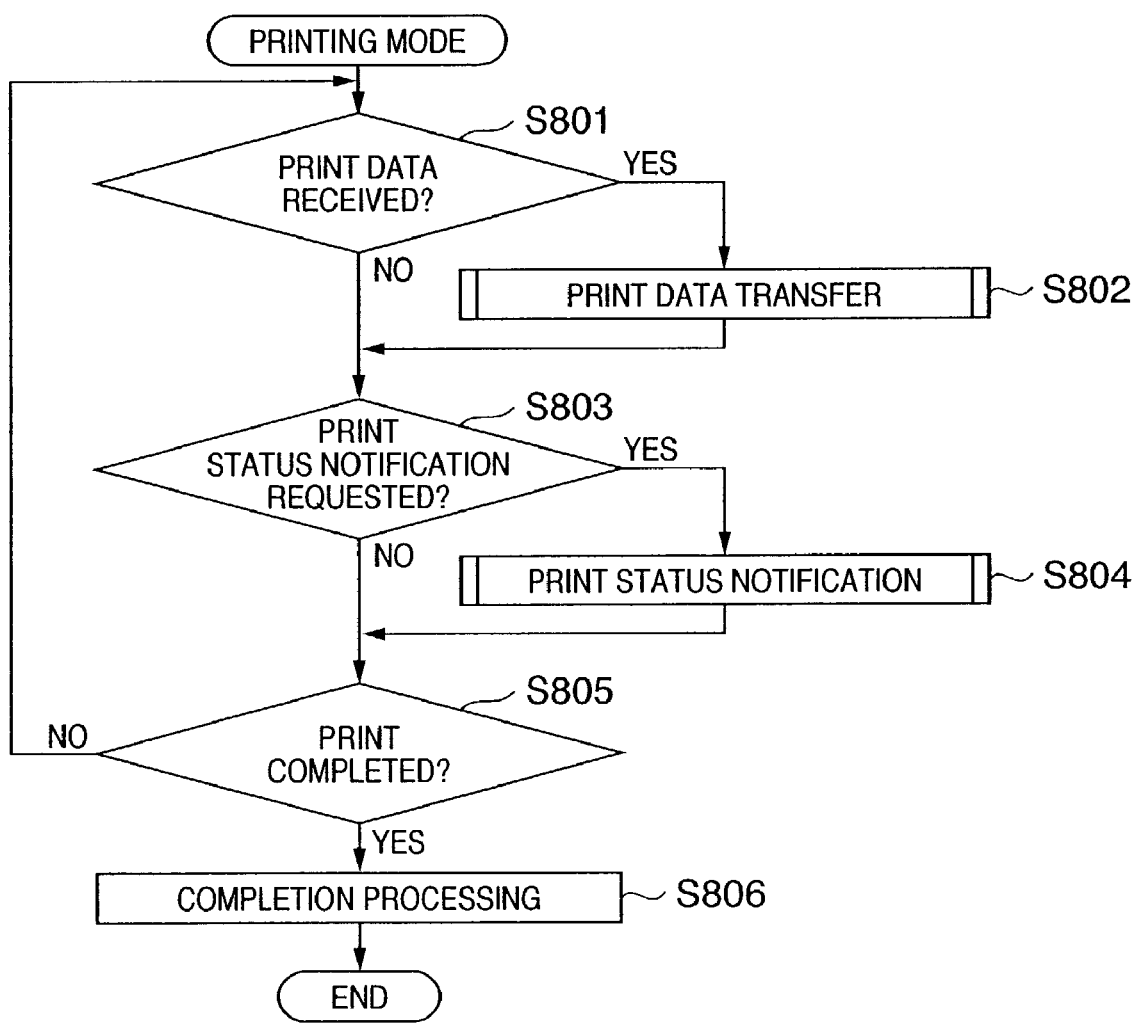
FIG. 7 is a flowchart describing printing operation according to the embodiment of the present invention.

FIG. 7 is a flowchart describing printing operation of the image processing apparatus 100, which is executed by the CPU 101, in the printing mode shown in step S702 of FIG. 6.

First, in step S801, it is determined whether or not the image processing apparatus 100 has received print data from the processing apparatus 200. If YES, the control proceeds to step S802. If NO, the control proceeds to step S803. The print data is received via the logical channel of the end point 1 (305) shown in FIG. 3, which is used for receiving control data and print data. The received print data is temporarily stored in the image memory 104 of the image processing apparatus 100. Furthermore, the print data is received in a packet form, delimited in a predetermined length.

In step S802, the image processing apparatus 100 transfers the print data, received from the processing apparatus 200 and stored in the image memory 104, to the printing unit 115. Details of the print data transfer will be described later. Upon completion of the processing in step S802, the control proceeds to step S803.

In step S803, it is determined whether or not the image processing apparatus 100 has received a print status notification request from the processing apparatus 200. If YES, the control proceeds to step S804. If NO, the control proceeds to step S805. The print status notification request is received via a logical channel of the end point 2 (306) shown in FIG. 3, which is used for transmitting a print status. Note the reception of the print status notification request is not reception of actual data, but is reception of an IN packet compliant with the USB communication standard.

In step S804, the image processing apparatus 100 receives data indicative of print statuses from the printing unit 115, and transfers the received data indicative of print statuses to the processing apparatus 200. Details of the print-status-data transfer will be described later. Upon completion of the processing in step S804, the control proceeds to step S805.

In step S805, it is determined whether or not print data from the processing apparatus 200 has ended. If YES, the control proceeds to step S806. If NO, the control returns to step S801. The end of print data from the processing apparatus 200 can be detected by analyzing only a part of the data indicative of print statuses, which is acquired in step S804, and determining whether printing operation is in progress or completed. Herein, the data indicative of print statuses is a series of character strings representing whether printing of the printing unit 115 is in progress or completed, the residual amount of toner or ink in the printing unit 115, a print error state of the printing unit 115, the remaining amount of memory in the printing unit 115 and so forth. Analyzing a part of the data indicative of print statuses indicates the following processing. Namely, only a character string indicative of whether printing of the printing unit 115 is in progress or completed is extracted from the data indicative of print statuses of the printing unit 115 (a series of character strings representing whether printing of the printing unit 115 is in progress or completed, the residual amount of toner or ink in the printing unit 115, a print error state of the printing unit 115, the remaining amount of memory in the printing unit 115 and so forth), which is temporarily stored in the image memory 104 of the image processing apparatus 100, and analyzed as to whether the printing is in progress or completed. Herein, the data indicative of print statuses of the printing unit 115 is not analyzed entirely. According to this determination method, since data indicative of print statuses is not entirely analyzed, but only a character string indicative of whether printing of the printing unit 115 is in progress or completed is extracted and analyzed, it is possible to assure detection of print completion and reduce a processing load of the CPU 101.

Note that the print data end detection method is not limited to the above-described method but, for instance, the following method is available. More specifically, print data from the processing apparatus 200 is normally transmitted in a packet having a predetermined fixed length. For instance, it is often the case that 64 bytes are used as a transfer unit. However, print data from the processing apparatus 200 does not always have a data length which is exactly divisible by 64 bytes. In this case, the last packet of the print data from the processing apparatus 200 is naturally a short packet having less than 64 bytes. For instance, assume that a print data length is 100,000 bytes and a normally used packet length is 64 bytes. Dividing the total print data length 100,000 bytes by the packet length 64-bytes results in quotient 1,562 with remainder 32. Therefore, the CPU 101 transfers 1,562 64-byte packets and one short 32-byte packet. By detecting the last short packet, the end of print data can be detected. Furthermore, there may be a case where the total print data length is exactly divisible by 64 bytes. In this case, it is a general practice to transfer a null packet having 0 data length after all the print data is transferred. By detecting the null packet, the CPU 101 is able to detect print data end even in a case where the total print data length is exactly divisible by 64 bytes. According to this determination method, by merely monitoring a packet length of print data from the processing apparatus 200, it is possible to assure detection of print completion, and a simplified processing program can be expected.

Alternatively, the following print data end detection method is possible. More specifically, referring to FIG. 7, when print data reception ends, the control no longer proceeds to step S802. The number of times the control directly proceeds from step S801 to S803 consecutively is counted, and when the counted number exceeds a predetermined value, the end of print data can be determined. According to this determination method, by merely counting the number of times the control directly proceeds from step S801 to S803 and determining whether or not a predetermined number of times has been counted, it is possible to assure detection of print completion, and a simplified processing program can be expected.

Furthermore, the following print data end detection method is possible. More specifically, referring to FIG. 7, when print data reception ends, the control no longer proceeds to step S802. The time period the control directly proceeds from step S801 to S803 consecutively is timed, and when the time period exceeds a predetermined time period, the end of print data can be determined. According to this determination method, by merely timing the time period the control directly proceeds from step S801 to S803 and determining whether or not a predetermined time period has lapsed, it is possible to assure detection of print completion, and a simplified processing program can be expected.

When print completion is determined in step S805, the control proceeds to step S806 where print-operation completion processing is performed. Print-operation completion processing includes discharging a printing material outside the apparatus, sounding print-operation completion alarm from a speaker (not shown), informing print-operation completion by the operation display unit 108 or display unit 208, and so forth.

Figure 8:
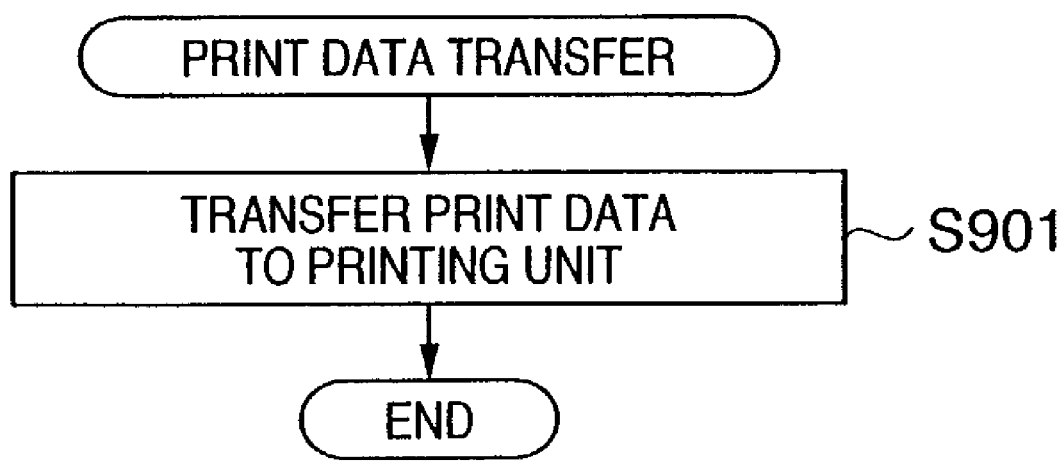
FIG. 8 is a flowchart describing a print data transfer process according to the embodiment of the present invention.

FIG. 8 is a flowchart describing a print data transfer process of the image processing apparatus 100 executed by the CPU 101, which is performed in step S802 in FIG. 7.

In step S901, the print data received in step S801 is transferred to the printing unit 115. The CPU 101 temporarily stores in the image memory 104 of the image processing apparatus 100 the print data received via the logical channel of the end point 1 (305) shown in FIG. 3, which is used for receiving control data and print data, and transfers the data to a logical channel of the end point 1 (405) shown in FIG. 4, which is used for receiving control data and print data. At this stage, the CPU 101 transfers the print data as it is, without performing any editing or processing on the content of the print data transferred from the end point 1 (305) to the end point 1 (405). The print data is transferred in a packet form, delimited in a predetermined length. Note that the interface 0 (304) in the device 301 shown in FIG. 3 and interface 0 (404) in the device 401 shown in FIG. 4 are employed so that one can assume the other does not exist. More specifically, processing of the printer driver software installed in the processing apparatus 200 is not at all different from the case where the processing apparatus 200 is directly connected with the printing unit 115 through a USB interface. Therefore, in a case where the printing unit 115 is changed to a different one, the printer driver software for the changed printing unit can be used without a change.

Figure 9:
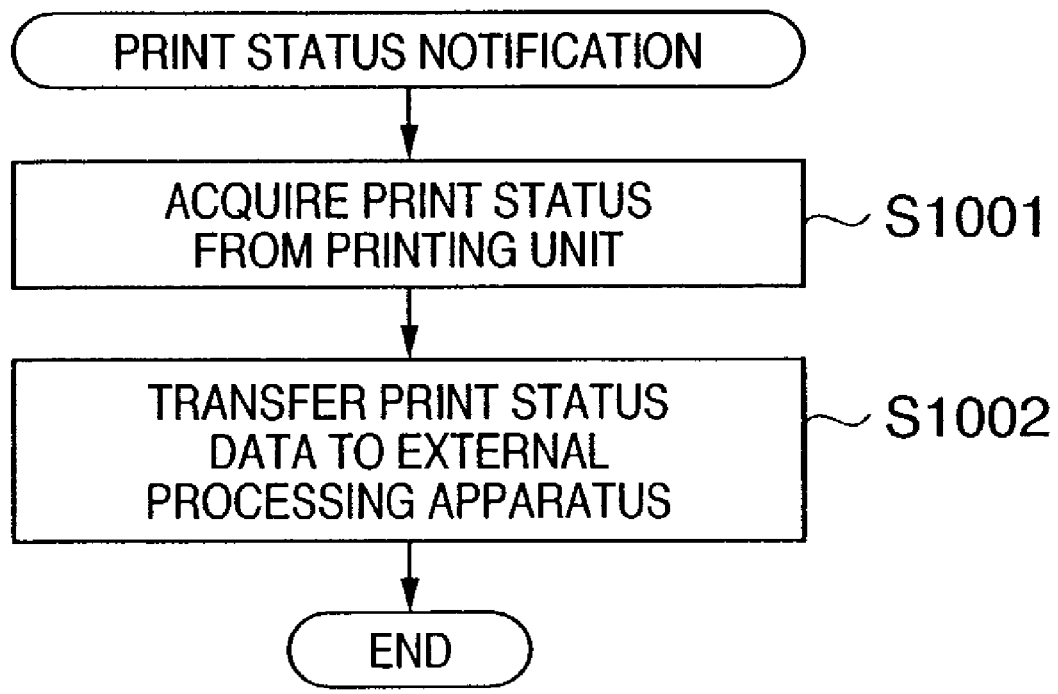
FIG. 9 is a flowchart describing a print status data transfer process according to the embodiment of the present invention.

FIG. 9 is a flowchart describing a print status data transfer process of the image processing apparatus 100 executed by the CPU 101, which is performed in step S804 in FIG. 7.

In step S1001, the CPU 101 acquires data indicative of print statuses from the printing unit 115 by controlling the USB host control unit 114. The data indicative of print statuses is acquired via the logical channel of the end point 2 (406) shown in FIG. 4, which is used for transmitting a print status. The acquired data indicative of print statuses is temporarily stored in the image memory 104 of the image processing apparatus 100. Note that the acquired data indicative of print statuses has a packet form delimited in a predetermined length.

In step S1002, the CPU 101 transmits the data indicative of print statuses, which is temporarily stored in the image memory 104 of the image processing apparatus 100, to the logical channel of the end point 2 (306) shown in FIG. 3 which is used for transmitting a print status. At this stage, the CPU 101 transfers the data indicative of print statuses as it is, without performing any editing or processing on the content of the data indicative of print statuses which is transferred from the end point 2 (406) to the end point 2 (306). Furthermore, at this stage, by analyzing a part of the data indicative of print statuses which is temporarily stored in the image memory 104 of the image processing apparatus 100, print completion can be detected to be used for the print completion determination in step S805 in FIG. 7. The print status data is transferred in a packet form, delimited in a predetermined length. Note that the interface 0 (404) in the device 401 shown in FIG. 4 and interface 0 (304) in the device 301 shown in FIG. 3 are employed so that one can assume the other does not exist. More specifically, processing of the printer driver software installed in the processing apparatus 200 is not at all different from the case where the processing apparatus 200 is directly connected with the printing unit 115 through a USB interface. Therefore, in a case where the printing unit 115 is changed to a different one, the printer driver software for the changed printing unit can be used without a change.

Next, the control of the printing unit 115 and the command transfer control to the printing unit 115 are described with reference to FIGS. 10 and 11.

Figure 10:
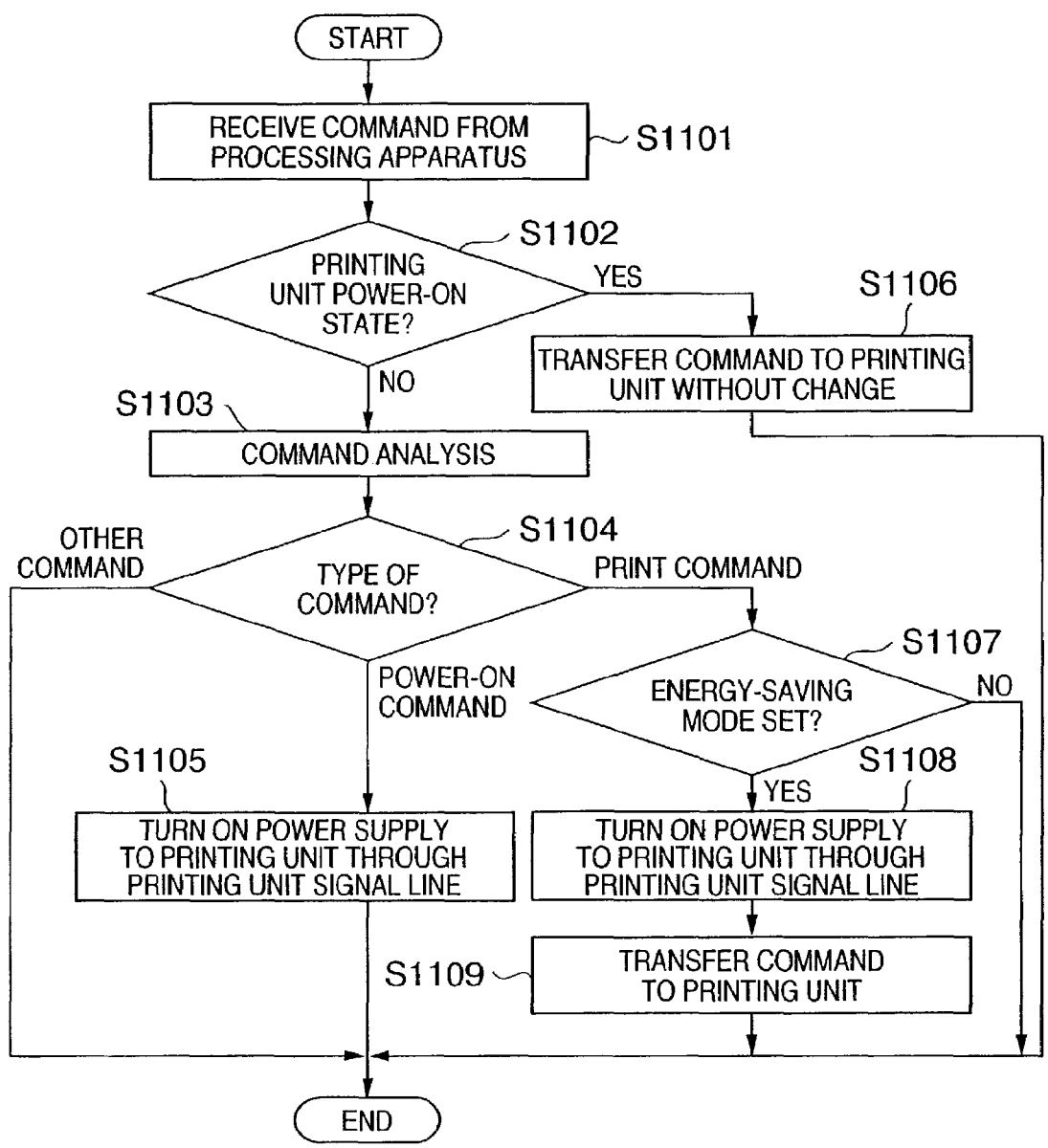
FIG. 10 is a flowchart describing a control procedure of the printing unit according to the embodiment of the present invention.

FIG. 10 is a flowchart describing a control executed in a case where the image processing apparatus 100 according to the present embodiment receives a command related to the printing unit 115 from the processing apparatus 200.

When the USB function control unit 113 of the image processing apparatus 100 receives command data related to the printing unit 115 from the processing apparatus 200 in step S1101, the state of power supply to the printing unit 115 is determined in step S1102. If the power is ON, since the image processing apparatus 100 does not need to analyze the data from the processing apparatus 200 as described above, the control proceeds to step S1106 where the received data without a change is transferred to the printing unit 115 through the USB host control unit 114. Whereas, if it is determined in step S1102 that power supply to the printing unit 115 is OFF, the control proceeds to step S1103 where the command from the processing apparatus 200 is analyzed. In step S1104, if the command analysis finds that the command is to turn on power supply to the printing unit 115, the control proceeds to step S1105. In step S1105, a signal for turning on power supply to the printing unit 115 is transmitted by the printing unit signal controller 116 through a signal line corresponding to the power ON/OFF key, which controls signals inputted to the printing unit 115, among the signal lines connected to the printing unit 115.

In step S1104, if the command from the processing apparatus 200 is a command other than a print request command, the control ends without receiving the command. Meanwhile, if the command from the processing apparatus 200 is a print request command, the control proceeds from step S1104 to step S1107 where it is determined whether or not the energy-saving mode is set. If it is determined by the operation display unit 108 that the image processing apparatus 100 is set in the energy-saving mode, then in step S1108, a signal for turning on power supply to the printing unit 115 is transmitted by the printing unit signal controller 116 through a signal line corresponding to the power ON/OFF key, which controls signals inputted to the printing unit 115, among the signal lines connected to the printing unit 115. Then in step S1109, the received print request command is transmitted from the USB host control unit 114 to the printing unit 115 through the USB interface.

The above-described method enables the printing unit 115 to control its power supply regardless of the features, e.g., an automatic power resume feature. Therefore, in the case of the energy-saving mode or other state that requires turning off power supply to the printing unit 115, it is possible to bring the printing unit to a complete power shut-off state. By virtue of this, it is possible to cut down the power consumption which has conventionally been consumed in the standby state for the automatic power resume feature.

In other words, when power supply to the printing unit 115 is ON, data addressed to the printing unit 115 can be received by the CPU 101 through the USB host control unit 114, or data transmitted from the processing apparatus 200 through the USB function control unit 113 can be received directly by the printing unit 115. Meanwhile, when power supply to the printing unit 115 is OFF, the CPU 101 analyzes received data. As a result of the analysis, a print command can be transmitted to the printing unit 115, or in a case of a power-ON command, power supply to the printing unit 115 can be turned on from the printing unit signal controller 116.

By virtue of the above control, it is possible to achieve further energy saving of the printing unit 115, while maintaining excellent performance of the image processing apparatus 100 and permeability of data in printing unit operation on the power-ON state.

Next, a procedure for controlling the power supply ON/OFF state of the printing unit 115 in the image processing apparatus 100 according to the present embodiment is described with reference to the flowchart in FIG. 11.

First in step S1201, it is determined whether or not the image processing apparatus 100 is set in the energy-saving mode. If the energy-saving mode is not set, the control ends. If the energy-saving mode is set in step S1201, the control proceeds to step S1202. Then, it is determined whether or not the image processing apparatus 100 satisfies a condition for shifting to the energy-saving state. Conditions for shifting to the energy-saving state include, for instance, a case where there is no printing instruction over a predetermined period of time, or a case where the connection between the image processing apparatus 100 and the processing apparatus 200 is disconnected. However, the conditions are not limited to the one mentioned above, and an arbitrary condition may be set depending on respective purposes. If the condition for shifting to the energy-saving state is satisfied in step S1202, the image processing apparatus 100 shifts to the energy-saving mode in step S1203. Then in step S1204, power supply to the printing unit 115 is turned off by the printing unit signal controller 116. By the foregoing control, the power-off state of the printing unit 115 in the energy-saving mode can be realized.

As described above, according to the present embodiment, the power ON/OFF control of the printing unit 115 is realized by transmitting a signal to the signal line, corresponding to the power ON/OFF key, by the printing unit signal controller 116. On the contrary, conventionally, when power supply to the printing unit 115 is ON, data is transmitted from the USB host control unit 114 for operating the printing unit 115, and when the printing unit 115 is in a standby state, data transmission from the USB host control unit 114 does not cause an operation of the printing unit 115 unless the printing unit 115 is provided with the feature (automatic power resume feature) for resuming its power upon data reception. Or with such the feature, power is consumed even under the standby state of the printing unit 115. However, according to the present embodiment, the printing unit 115 can be brought back from a power-OFF state (standby state) to a power-ON state even if the printing unit 115 does not have the automatic power resume feature or the feature is inactivated.

Note, although the foregoing embodiment has described a case of controlling the power ON/OFF state of the printing unit 115 in the energy-saving mode, the present invention is not limited to the printing unit 115. A reading unit for reading an original document, an image sensing unit such as a digital camera for sensing an object, or a communication unit for transmitting/receiving data to/from an external device through a communication line may be connected to the image processing apparatus in place of the printing unit, and the similar control may be performed to achieve the same effects.

As set forth above, even in a case where the interface unit of the image processing apparatus has a configuration shown in FIGS. 1, 3, and 4, it is possible to perform power supply control in units of each function of the image processing apparatus when the apparatus is shifted to the energy-saving mode.

Note in the foregoing embodiment, although setting/canceling of the energy-saving mode is possible, the present invention is not limited to this. The energy-saving mode may be fixedly set in the image processing apparatus.

Other Embodiment

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

Figure 11:
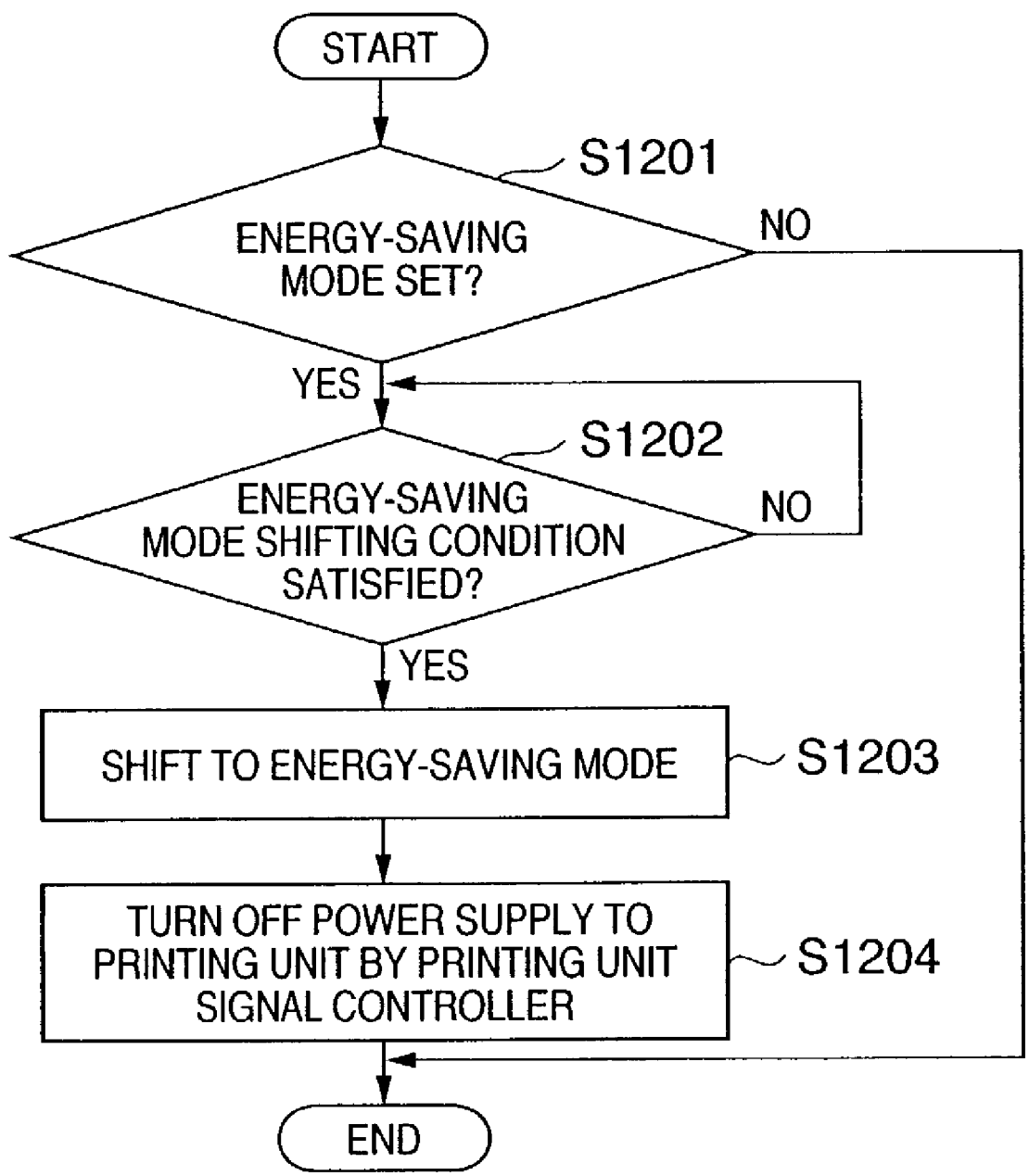
FIG. 11 is a flowchart describing power ON/OFF control of the printing unit according to the embodiment of the present invention.

In a case where the present invention is applied to the aforesaid storage medium, the storage medium stores program codes corresponding to the flowcharts in FIGS. 10 and 11 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
a plurality of data processing units including a recording unit;
a first interface unit connected to an external device via a first USB bus, wherein a logical channel of USB communication on the first USB bus is assigned for each of the plurality of data processing units;
a second interface unit directly connected to the recording unit via a second USB bus, wherein the second interface unit is defined as a host of USB communication on the second USB bus and the recording unit is defined as a slave of USB communication on the second USB bus;
a memory configured to temporarily store image data received by the first interface unit;
a recording control unit configured to transfer the image data from the memory to the recording unit and to acquire ON/OFF state information of the recording unit via the second interface unit;
a power control unit configured to control power ON/OFF of the recording unit via a signal line different from the second USB bus, wherein the signal line directly connects the recording unit and the power control unit; and
a control unit configured to control the plurality of data processing units, the second interface unit and the power control unit, on the basis of control data received by the first interface unit.

2. The image processing apparatus according to claim 1, wherein the plurality of data processing units include a scanning unit, and the image processing apparatus outputs information notifying initiation of scanning by the scanning unit to the external device via the first interface unit.

3. The image processing apparatus according to claim 1, wherein the plurality of data processing units include a facsimile communication unit, and the first interface unit receives data to be transmitted by the facsimile communication unit from the external device.

4. The image processing apparatus according to claim 1, wherein the second interface unit periodically receives state information from the recording unit.

5. The image processing apparatus according to claim 1, wherein the first interface, the second interface, the recording control unit, and power control unit are connected to the control unit via a common bus.

* * * * *